US010011321B2

(12) United States Patent
Kohlheb et al.

(10) Patent No.: US 10,011,321 B2
(45) Date of Patent: Jul. 3, 2018

(54) DEVICE FOR DRIVING A COMMON SHAFT BY PUSHING AND PULLING HAND MOVEMENTS, ESPECIALLY FOR THREE-WHEELED VEHICLES FOR DISABLED SUBJECTS

(71) Applicant: STRINGDRIVE TECHNOLOGIES KFT., Szolnok (HU)

(72) Inventors: Robert Kohlheb, Pomaz (HU); Zoltan Kalazi, Budapest (HU)

( * ) Notice: Subject to any disclaimer, the term of this patent is extended or adjusted under 35 U.S.C. 154(b) by 0 days.

(21) Appl. No.: 14/420,664

(22) PCT Filed: Aug. 22, 2013

(86) PCT No.: PCT/HU2013/000084
§ 371 (c)(1),
(2) Date: Feb. 10, 2015

(87) PCT Pub. No.: WO2014/030022
PCT Pub. Date: Feb. 27, 2014

(65) Prior Publication Data
US 2015/0217831 A1    Aug. 6, 2015

(30) Foreign Application Priority Data
Aug. 23, 2012    (HU) ...................................... 1200489

(51) Int. Cl.
*B62M 1/14*    (2006.01)
*B62M 1/16*    (2006.01)
(Continued)

(52) U.S. Cl.
CPC ............... *B62M 1/16* (2013.01); *A61G 5/023* (2013.01); *A61G 5/025* (2013.01); *B62K 5/023* (2013.01); *Y10T 74/1556* (2015.01)

(58) Field of Classification Search
CPC .......... B62M 1/16; B62K 5/025; A61G 5/025; Y10T 74/1556
(Continued)

(56) References Cited

U.S. PATENT DOCUMENTS 4,811,964 A * 3/1989 Horn ...................... A61G 5/023
188/2 F
5,282,640 A * 2/1994 Lindsey ................... B62M 1/12
280/233
(Continued)

FOREIGN PATENT DOCUMENTS

DE    20 2004 017142 U1    3/2005

OTHER PUBLICATIONS

International Search report issued in International Application No. PCT/HU2013/000084, dated Dec. 13, 2013.

*Primary Examiner* — Tony H Winner
(74) *Attorney, Agent, or Firm* — Handal & Morofsky LLC

(57) ABSTRACT

Device for driving a common shaft by pushing and pulling hand movements, that comprises respective driving bars for the left and right hands, and a mechanical unit that converts both the forward and backward movements of the pushed, respectively pulled driving bars to rotate a driven shaft, wherein respective biased rope drums (28, 29; 61, 62) are provided at both sides of the driven shaft, and on the rope drums respective ropes (30, 60) are arranged as windings, and the driving bars (15, 16; 51) are interconnected and pivoted around a common shaft (17, 52), the ropes are coupled to the respective driving bars in such a way that at one of the two sides an assembly is provided that reverses the direction of the rope displacement to become opposite to the direction of the displacement of the associated driving bar (16).

11 Claims, 6 Drawing Sheets

(51) Int. Cl.
*B62K 5/023* (2013.01)
*A61G 5/02* (2006.01)

(58) Field of Classification Search
USPC .............................................. 280/225, 242.1
See application file for complete search history.

(56) References Cited

U.S. PATENT DOCUMENTS

| | | | | |
|---|---|---|---|---|
| 5,429,379 | A * | 7/1995 | Grigoriev | B62K 25/08 280/212 |
| 5,542,689 | A * | 8/1996 | Chalfant | B62M 1/12 280/233 |
| 7,021,639 | B2 * | 4/2006 | Park | B62M 1/12 280/233 |
| 7,967,313 | B1 * | 6/2011 | Eggert | B62K 5/02 280/224 |
| 2007/0227277 | A1 * | 10/2007 | Monno | B62M 1/12 74/89 |
| 2008/0023932 | A1 * | 1/2008 | Baumbach | A61G 5/023 280/250.1 |
| 2009/0058034 | A1 | 3/2009 | Leslie | |
| 2010/0044995 | A1 * | 2/2010 | Park | B62M 1/16 280/246 |
| 2011/0266768 | A1 * | 11/2011 | Kohlheb | B62M 1/26 280/251 |

* cited by examiner

DEVICE FOR DRIVING A COMMON SHAFT BY PUSHING AND PULLING HAND MOVEMENTS, ESPECIALLY FOR THREE-WHEELED VEHICLES FOR DISABLED SUBJECTS

CROSS REFERENCE TO RELATED APPLICATIONS

This application is the National Stage Entry of International Application No. PCT/HU2013/000084, filed Aug. 22, 2013.

TECHNICAL FIELD

The invention relates to a device for driving a common shaft by pushing and pulling hand movements, especially for three-wheeled vehicles for disabled subjects that comprises respective driving bars for the left and right hands, and a mechanical unit that converts both the forward and backward movements of the pushed, respectively pulled driving bars to rotate a driven shaft.

STATEMENT REGARDING FEDERALLY SPONSORED RESEARCH OR DEVELOPMENT (Not applicable)

BACKGROUND OF THE INVENTION

There are several know devices where a shaft is rotated by the pushing and pulling movements of the hands, and out of which perhaps the most important applications are vehicles driven by human power, especially three or more wheeled vehicles made for disabled subjects. For sporting purposes there are hand-driven bicycles known, although these are not widely used.

In fitness room there are several fitness machines that use hand power, but in these training devices it is not a task the rotation of a shaft, although on such rotating shafts one can easily mount a braking system.

Finally it should be mentioned that the pushing and pulling movement of hands can be used for driving smaller boats, i.e. such movements can be used for the rotation of a propeller.

The systems used for such applications use the alternating forward and backward movement of the hands, and in a forward-backward cycle only one direction of hand movement is utilized for driving. From ergonomic point of view solutions are more preferred where the two hand move simultaneously forward and backward and exerts then pushing and pulling forces. A typical example of the simultaneous hand movement is rowing, although in such cases only the pulling movement is used for driving the boat because the other direction is used to return the oars to their initial position. When work is done by both hand it is also a significant aspect how far the required force vector fall from the body center in lateral direction. There are drives using both hands, such as described in U.S. Pat. No. 4,705,284 wherein the two handgrips are laterally far away from the line of the shoulders. In such lateral position it is tiring to work, especially to push. In this patent this problem is solved in such a way that the vehicle is driven only in the pulling direction by the handgrips and in the other direction a freewheel mechanism makes the movement free.

An example for working in only one direction can be found in a very old publication of U.S. Pat. No. 1,559,826, wherein two handgrips are use for rotating a boat propeller, but here also only one direction of the movement is useful. The mechanical transmission is resolved here by using a gear-transmission that has a very low efficiency, therefore such solution have not of spread.

From the point of view of exerting forces it is required that the vector of the required force be not outside the position of the shoulders, and such can be even within the should lines.

In case of hand driven vehicles a further problem arises, namely the driving arm used for pushing and pulling require both hands and one has no third hand for steering. There are hand driven vehicles know where the chain driving of bicycles is imitated by hands, wherein the turning of the driving handgrips steer the vehicle. In such cases freely rotating handgrips are required, furthermore it is ergonomically less preferred and more tiring to rotate handgrips and to turn them at the same time when steering is needed as if the task was only pushing and pulling.

The pulling and pushing movement use different muscle groups, and there are subjects that can be loaded in one of these movement direction more than in the other one, therefore there is a need for a solution where the transmission ration for pulling and pushing can be different and can be adjusted independently.

In the international publication WO/2010/084363 a device is described for the alternating driving of bicycles, in which the rotating movement of the pedals is converted into alternating swinging movement, then the alternatingly forward and backward moving of respective swinging arms pull a pair of ropes wound previously to rope drums arranged at both sides of the rear wheel hub, and the required torque is provided by the tangential forces acting on the rope drums.

A preferable design of such rear hubs is described in the international publication WO/2012/001436, in which it is explained that in the interior of the rope drums respective coil springs are arranged that provide for the return movement of the rope drum and for the biasing of the rope when the direction of the movement gets reversed. It is also described in this publication how the respective freewheels have to be arranged in the hub, and a third freewheel is also used that enables the reverse rotating of the driven wheel.

The solutions described in these publications have high efficiency, and the extent of displacement of the ropes in the respective cycles can be adjusted by changing the distance of pulled rope wheels placed on the swinging arms from the axis of rotation.

SUMMARY OF THE INVENTION

The primary object of the invention is to provide a device, in which the simultaneous pushing and pulling movement of both hands can be utilized for driving a common shaft with a high efficiency. The driven shaft can equally belong to a bicycle or to a three or more wheeled hand driven vehicle, but it can be the braked shaft of a fitness training machine or a shaft that drives the propeller of a boat.

A secondary object of the invention has significance only in case of hand driven vehicles is to provide a device which on the top of the afore said driving can also be used for steering the vehicle.

A further object of the invention is to provide a device that is capable of solving the previously mentioned two objectives and in which the transmission ration between the displacement of the hand movements and the rotation of the driven shaft can also be adjusted, and wherein the transmission ratios for the pushing and pulling movements can be adjusted independent from each other so that these transmission ratios can be different.

For solving these objectives it has been recognized that the principle of the afore mentioned alternating drive can be used for the present purposes in case the driving arms are moved together, and in one side a direction reversal unit is inserted to create thereby a pair of alternatingly moving arms, and in each direction of such arm movements a respective rope drum is driven.

According to the invention a device has been provided for the driving of a common shaft by pushing and pulling hand movements, especially for three-wheeled vehicles for disabled subjects that comprises respective driving bars for the left and right hands, and a mechanical unit that converts both the forward and backward movements of the pushed, respectively pulled driving bars to rotate a driven shaft, wherein according to the invention respective biased rope drums are provided at both sides of the driven shaft, and on said rope drums respective ropes are arranged so that at each side a winding is provided on said rope drums with a predetermined number of turns, and the pulling of the respective ropes causes rotation of the shaft in the same direction, and the driving bars are interconnected and they are pivoted for limited angular displacement around a common shaft, and in a first direction the displacement requires pushing motion and in the opposite second direction pulling motion, and at the respective driving bars owing to their interconnection the pushing and pulling motions cause simultaneous and identical bar displacements at both sides, the ropes that are associated with and connected to the respective rope drums are coupled to the respective driving bars in such a way that at one of the two sides an assembly is provided that reverses the direction of the rope displacement to become opposite to the direction of the displacement of the associated driving bar, whereby the pushing movement results in the pulling of the associated rope, and one of the rope drums is driven by the pushing movement of the driving bars, while the other rope drum is driven by the pulling motion of the driving bars.

For changing the transmission ration at the pushing and pulling motions it is preferable if at the respective sides the paths of the ropes are led through respective rope wheels which are arranged so that their distances from the shaft of rotation can be adjusted within a limited range and independent from each other, whereby the transmission ratio between the displacement of the driving bars and the angular displacement of the driven shaft can be separately adjusted for the pushing and pulling movements.

For the symmetric distribution of the load it is preferred if respective pairs of ropes are wound on each rope drum and these pairs are pulled simultaneously and in the same extent by any movement of the associated driving bar.

For use in vehicles the steering can be ensured if in the direction which is transverse to the direction of the pushing and pulling movements a rigid connection is provided between the driving arms and the driven shaft, and the device is held by a support tube of a frame, and with respect to the support tube the device is pivoted for angular displacement around an axis that is transverse to the direction of the pushing and pulling movements, and the angular displacement of the driving bars causes the same angular displacement of the driven shaft.

It is then preferred if the frame belongs to a wheeled vehicle and the driven shaft is the shaft of the driven wheel of the vehicle preferably it is a three-wheeled vehicle made for disabled subjects, and the driven wheel is the first, steered wheel of the vehicle.

In a preferable embodiment the driven shaft is held by a fork which is pivotally kept in a fork receiving tube that is connected with the frame, and beyond the fork receiving tube the shaft of the fork is connected through a cardan coupling to a stiff control bar having a tilted axis, and the pivoted shaft of the pushing and pulling motion is connected to the control bar, the pushing and pulling driving bars are connected to this pivoted shaft, the pushing driving bar is extended over the shaft and the displacement of the extended part of the driving bar is opposite to the displacement of the hand-held part of the pushed driving bar, and the rope wheel that provides for the direction reversal of the rope is slidably fixed to this extended part of the driving bar, the pulling driving bar has also a portion that extends over the pivoted shaft and the two extended parts of the two driving bars are pivotally connected to first ends of a pair of connection members and the second ends of the connection members are pivotally connected to a sliding bar that is slidably guided for axial displacement along the control bar, so that these pivotal connections ensure the identical displacement of the two driving bars.

In a second embodiment a stiff fork-holding sleeve is connected to the frame, the shaft of the driven wheel is held by a fork with a fork bar held and pivotally guided for angular displacement in the fork holding sleeve, the fork bar extends beyond the fork holding sleeve in upward direction; the fork has branches interconnected by a block and in a transversal bore provided in the block a shaft is pivotally held that extends normal to the axis of the fork and constitutes said common shaft, a stiff tiltable frame is pivotally attached to the shaft that has a forward leg that extends beyond the frame and this extended leg constitutes a steering column and the upper part of the steering column is rigidly connected to a handlebar that constitutes both of said driving bars, and when the handlebar is pushed or pulled, the tiltable frame will turn around said common shaft in a predetermined angular range in upward or downward direction, the tiltable frame has lower legs constituted by shifting bars, rope wheels are guided along and adjustably fixed on said shifting bars and the paths of the respective ropes coming from the rope drums are led around said an associated one of said rope wheels, and in said extended part of the fork bar said direction-reversing rope wheel is pivotally fixed, and the rope branch that leaves the rope drum and associated with the pushing side leads through this direction-reversing rope wheel to the rope wheel guided on the associated shifting bar.

In that case it is preferred if in each side respective pairs of rope branches are wound on the rope drums, the shifting bars are made of respective pairs of spaced shifting bar plates, respective pairs of rope wheels are connected with respective shafts and they are held by and guided along said pairs of spaced shifting bar plates, and further three rope wheels are provided at each side, and at the pushing side these further three rope wheels are pivotally arranged on a common shaft so that they can be freely turned independent from each other, and their common shaft is fixed on a support stud attached to an upper end region of the fork shaft, wherein the rope wheels at the sides ensure the reversal of the direction of the associated rope branches and the central rope wheel acts as a balance wheel.

From the point of view of the rigidity of the design it is preferred if the tiltable frame is made of a rigid formation of a spatial double triangle that comprises two spaced parallel triangles welded by three tubes and reinforcing tubes connecting the triangles.

The device according to the invention provides a proper solution of the objectives set and can be equally used for a three- or more wheeled hand driven vehicle, for training and rehabilitation machines, for driving boats and to any other applications where there is a need that the simultaneous pushing and pulling of hands cause rotation of a shaft.

BRIEF DESCRIPTION OF THE DRAWINGS

The invention will now be described in connection with preferable embodiments thereof, in which reference will be made to the accompanying drawings. In the drawing.

DETAILED DESCRIPTION OF THE INVENTION

Figure 1:
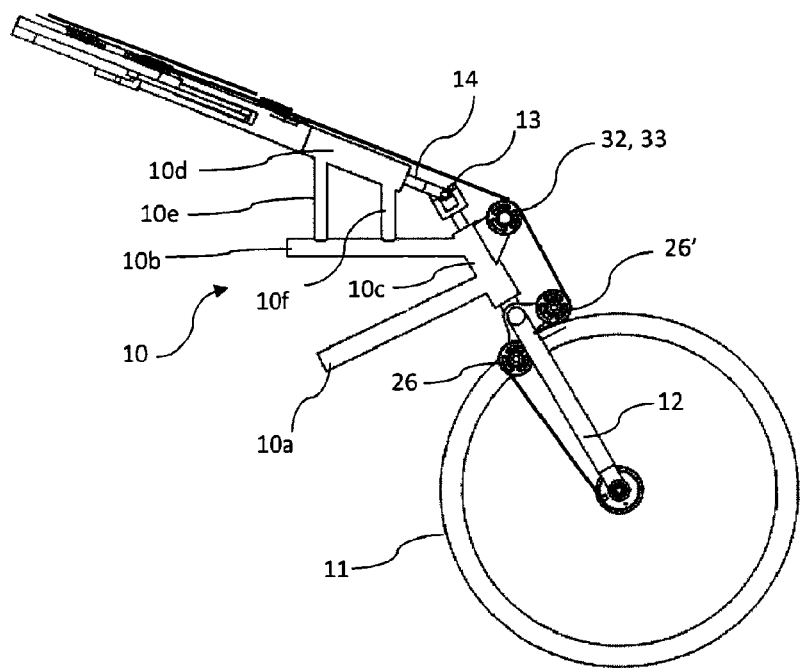
FIG. 1 shows the schematic side view of a first embodiment of the invention.

FIG. 1 shows the first embodiment of the invention, wherein the driven first part of a vehicle can be seen in side view. The vehicle comprises a frame 10 made of welded tubes, of which only the part holding front wheel 11 has been shown, the non-illustrated rear part of the frame 10 has a conventional design. In the embodiment shown the frame 10 comprises lower and upper support tubes 10a and 10b, a fork-receiving tube 10c interconnecting ends of the tubes 10a and 10b and a handlebar supporting tube 10d that is obliquely directed in downward and forward direction, which is connected with the upper support tube 10b by means of a pair of column tubes 10e and 10f for ensuring the required rigidity. The listed tubes 10a to 10f together constitute a stable and rigid mechanical assembly and they are attached together preferably by welding.

Figure 2:
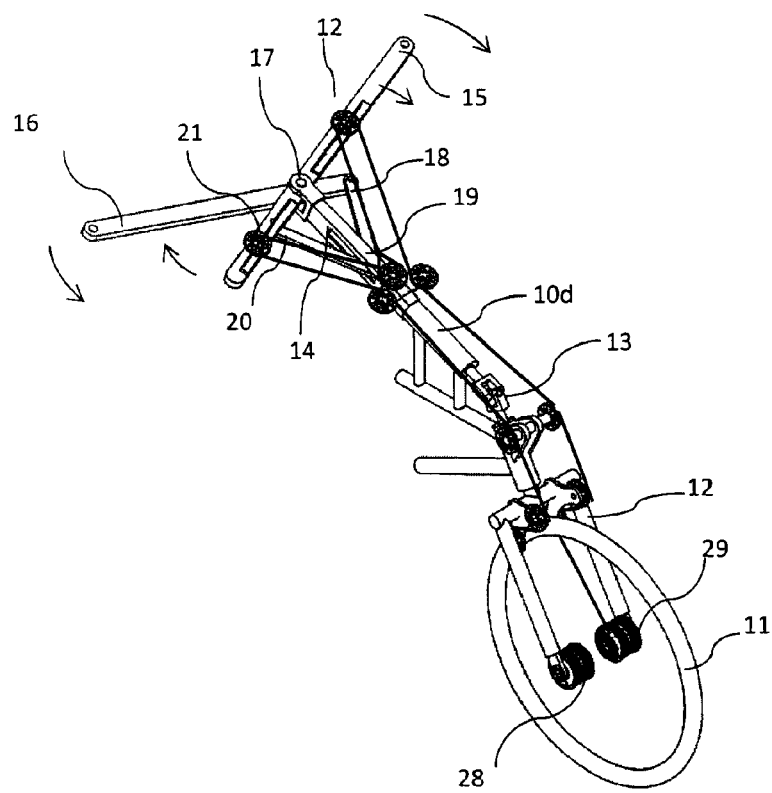
FIG. 2 is the elevation view of the embodiment of FIG. 1 projected from an angle at the end position of the pulling step.
Figure 3:
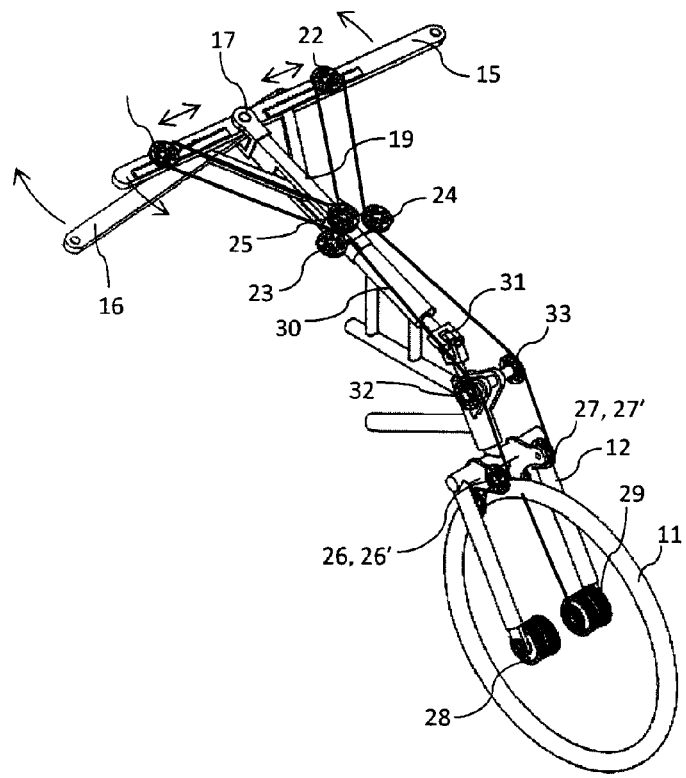
FIG. 3 is a view similar to that of FIG. 2 which shows the system in the end position of the pushing step.

In the interior of the fork receiving tube 10d of the frame 10 a fork 12 is arranged which is pivoted to be turned around its axis and the fork 12 has an upper end connected by means of a cardan coupling 13 with a lower end of a control bar 14 that can be better seen in FIGS. 2 and 3. The control bar 14 is held in the interior of the handlebar supporting tube 10d so that it can be turned around its owns axis within certain angular range.

Fig. shows the upper part of the control bar 14 with the attached constructional parts in the fully pulled position of the handle arms. The upper end portion of the control bar 14 is designed to have a fork shape, and its arms are arranged behind each other when seen form the view of FIG. 2. A pivot shaft 17 is arranged through holes of this fork that holds a left driving bar 15 and a right driving bar 16 that can be turned relative to each other and to the pivot shaft 17. The terms: "left" and "right" are associated with the left and right sides of the disabled subject who uses the vehicle. The driving bars 15 and 16 do not terminate at the pivot shaft 17 and they are projecting further beyond the shaft. In the exemplary embodiment the outwardly projecting section of the right driving bar 16 is shorter and its end is pivotally connected to a connection member 18 that has a lower end connected to a sliding pivotal bar 19. The projecting section of the left driving bar 15 extends in a greater length over the pivot shaft 17, whereas symmetrically opposite to the end of the side of the left driving bar 15, the upper end of a similar right connection member 20 is pivotally connected to the projecting section of the left driving bar 15, and the lower end of the right connection member 20 is also pivotally connected to the sliding pivotal bar 19. The two connection members 18, 20 and the extending section of the left and right driving bars 15, 16 constitute a pivotally interconnected deltoid formation that has a lower pivotal axis constituted by the sliding pivotal bar 19. The sliding pivotal bar 19 is slidably connected to the control bar 14 so that this connection has a single degree of freedom, i.e. it allows for the sliding pivotal bar 19 the move along the axis of the control bar 14, but prevents their displacement in a normal direction.

Such deltoid-shaped pivotal structures are known as such, and they have the property if only the left driving bar 15 is pushed in forward direction or pulled back, than this movement causes the right driving bar 16 to move forward or backward in the same direction and in the same extent. From this it follows that the left and right driving arms 15 and 16 will always move in the same way towards or away to or from the body of the disabled subject independent from the fact that the force exerted by the left or right hand of the subject is the same or different.

FIG. 3 differs from FIG. 2 in that it shows the assembly in its maximum forward position. For the sake of better visualization the reference numbers of the deltoid-shaped assembly were not indicated in FIG. 3. At both sides of the front wheel 11 respective rope drums are provided which are designed as disclosed in the previously mentioned international publication WO/2012/001436. The drawing shows only a single rope branch at the respective sides. On the left side of FIG. 3 the rope drum 28 is shown pulled when the driving bars are pushed, and the rope drum 29 on the right side is pulled when the driving bars are pulled.

The assembly has ropes 30, 31 of which the rope 30 is highly loaded when the driving bars 15, 16 are pushed forward, while the rope 31 is loaded when these bars 15, 16 are pulled. The upper ends of both ropes 30, 31 are fixed and respectively looped around a rope end holding wheel 25 mounted on the control bar 14 so as to have and axis normal to this bar 14. Let us follow now the path of the rope 30: it starts at the rope end holding wheel 25 then the path of the rope 30 is lead through a pushing wheel 21 fixed to the arm section of the left driving bar 15 that extends over the pivot axis 17, then the path leads through a rope guiding wheel and 32, then through a pair of further guiding wheels 26, 26' (which cover each other in FIG. 3 but their position can be seen in FIG. 1), finally the rope reaches the pushing rope drum 28 and it is wound around this drum by a number of turns and finally the other rope end is attached to this drum 28. The path of the rope 31 (which loaded at pulling) in the other side is similar. The upper end thereof is fixed at the rope end holding wheel 25, then the path leads in upward direction till a pulling wheel 22 then its direction is reversed and the path goes down through a rope wheel 33 and through a pair of rope guiding wheels 27, 27' towards the rope drum 29 loaded in pulling mode. There it is similarly wound around the drum 29 and its lower end is fixed to thereto.

Because in FIG. 3 the left and right driving arms 15, 16 are in their maximum forward positions from there they can be moved only backwards. If the disabled subject pulls both of these driving arms towards his body, then the driving arms 15, 16 will move in the direction as shown by the arrow (in FIG. 3 upward), the pulling wheel 22 will move upwards because it is attached directly to the left driving arm 15, while the other pushing wheel 21 will move in downward direction. The upper movement of the rope 31 will pull through the several guiding wheels the pulling rope drum 29, and according to the downward winding of the rope, the rope drum 29 will drive the front wheel 11 forward.

At the same time the length of the rope 30 on the other side gets shorter and the rope 30 will remain tensioned because of the biasing force of a coil spring in the rope drum 28, and the excess length will be wound around this drum 28, but owing to a freewheel (not shown) connected to the rope rum 28 the front wheel 11 will not be driven at this side.

When the driving arms 15, 16 take the closest position to the body of the disabled subject, which is shown in FIG. 2, then they can be moved only by pushing in forward direction and they will be moved in downward direction as shown by the arrow in FIG. 2. During this movement the pushing wheel 21 moves upwards and the pulling wheel 22 downwards. Through the similar rope guiding the pulling force of the rope 30 will turn the left rope drum 28, whereby the front wheel 11 is driven forward, and the downwardly moved rope 31 on the other side will be wound up by the biasing force of the coil spring in this rope drum 28.

The assembly described will equally drive the front wheel 11 during the pushing and pulling movements, however, one side (in the drawing the left side) will always drive during the pushing mode and the other side will drive only in the pulling mode.

Let us observe the uppermost rope wheels 21 and 22 as shown in FIGS. 2 and 3. The shafts of these wheels can be moved in both directions along the double arrow of FIG. 3 in both directions along respective paths on the left driving bar 15 and along the other section of the same bar that extends over the pivot shaft 17 which paths are parallel with this bar 15. The movement can be realized e.g. as described in the publication WO/2010/084363. The two actuator elements can be made by a pair of handle grips (not shown) pulled on the respective end sections of the driving arms 15, 16, and by means of rotating these grips the transmission ration during pushing and pulling can be adjusted separately. When in a side the associated rope wheel 21 or 22 is close to the pivot shaft 17, then the force will be high and the displacement will be small, that corresponds to a short gear, and when the rope wheels 21 or 22 are positioned further away from the pivot axis 17 then a higher degree of front wheel movement will be associated with the same displacement of the driving bars 15, 16. In this way not only the transmission ratio can be adjusted, but this provides the possibility for the disabled subject to adjust a more comfortable pushing or pulling mode if he prefers one movement to the other.

Figure 4:
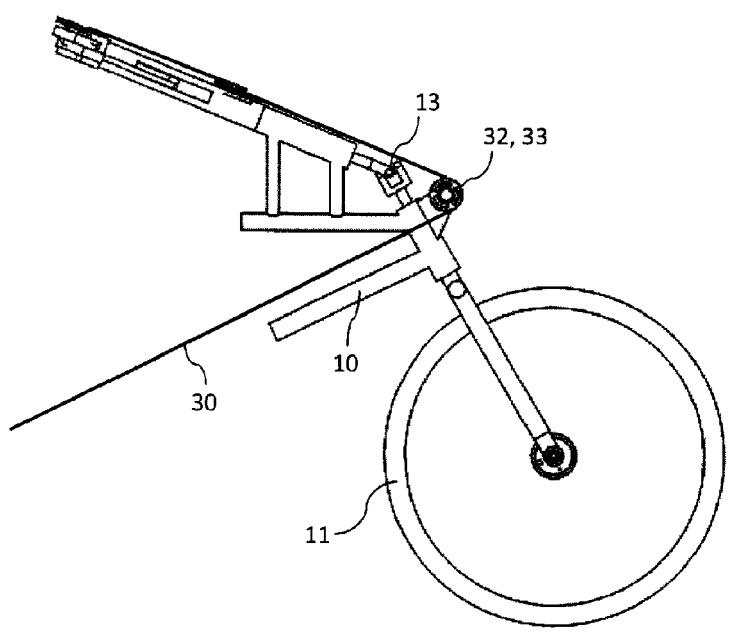
FIG. 4 is a side view similar to FIG. 1 in which not the first heel is the driven one.

FIG. 4 is a side view similar to FIG. 1, wherein the difference lies in that from the rope guiding wheels 32, 33 fixed to the frame the ropes will not be lead to the front wheel 11 but to a rear wheel (not shown). The solution according to the invention can drive not only the front wheel but also the rear one, however, in most of the cases the front drive is preferred.

A substantial advantage of this embodiment lies in that the driving bars 15, 16 can also be turned around the control bar 14 even when the vehicle is driven. The guiding of the rope is predominantly ensured by the wheels fixed to the control bar 14, and at the same time the rope wheels 16, 16' and 17, 17' are fixed to the fork 12 and they follow the turning of the front wheel. This will not disturb the above described rope path because the ropes will get slightly twisted around their axes which does not disturb their movement. By using this embodiment the disabled subject can use the driving arms both for driving and steering the vehicle, and following a short learning and training period the movement will be coordinated during all maneuvers.

Figure 5:
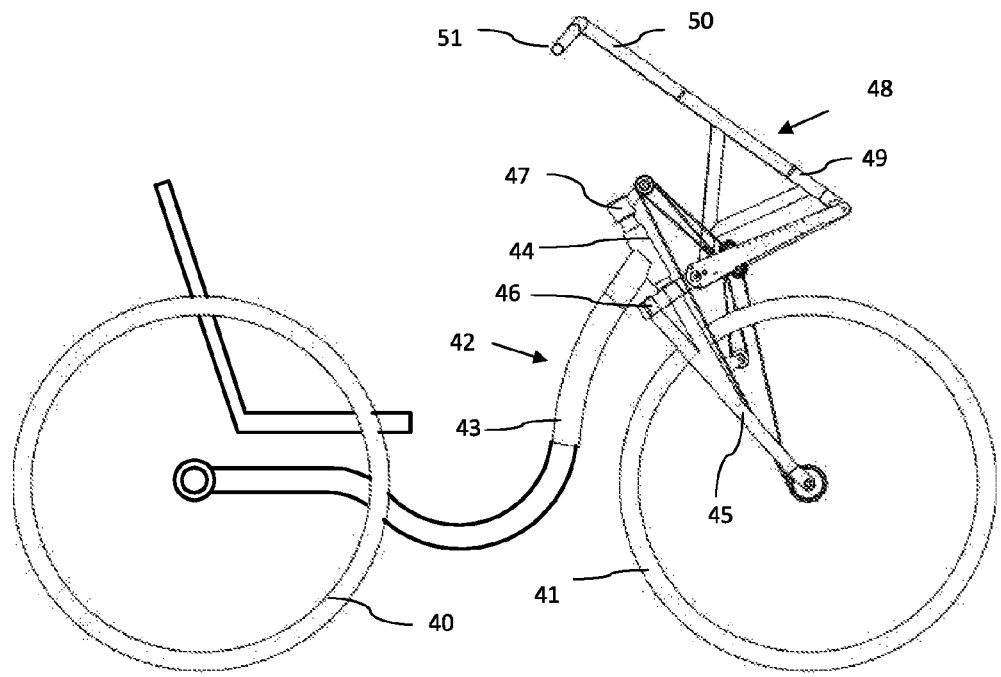
FIG. 5 shows the side view of a second embodiment of the invention in the end position of the pushing step.

FIG. 5 shows the second embodiment of the invention in the maximum forward position of a handlebar. The drawing shows the right rear wheel 40 schematically. In this embodiment also a front wheel 41 is driven, and the driven hub has the same design as in case of the first embodiment. Of the vehicle frame only a fork holding part 42 has been shown that comprises a bent support tube 43 and a fork holding sleeve 44 welded on the support tube 43. The vehicle has a front fork 45 that comprises respective pairs of tubes lead in V-form at each side of the frame owing to the high load acting thereon, and the tubes in each pair are united at their lower regions. The upper end of the tubes are connected and fixed to a connecting block 46 made of a light metal alloy. The fork 45 is pivotally arranged and fixed in the fork holding sleeve 44, and it has a short tube section 47 extending above the fork holding sleeve 44, and the role of this section will be explained at a later part of the specification.

The connecting block 46 has a forward part that defines a horizontal through bore in which a pivoted shaft 52 is arranged that is connected to a rear and lower vertex portion of a tiltable frame 48 which is designed as a spatial triangle and it can be turned around this shaft. The tiltable frame 48 has a forward leg 49 which is substantially longer than this triangle and its upwardly projecting part forms a steering column 50 on which a conventional handlebar 51 is fixed in a stable way that extends normal to the column 50.

Figure 6:
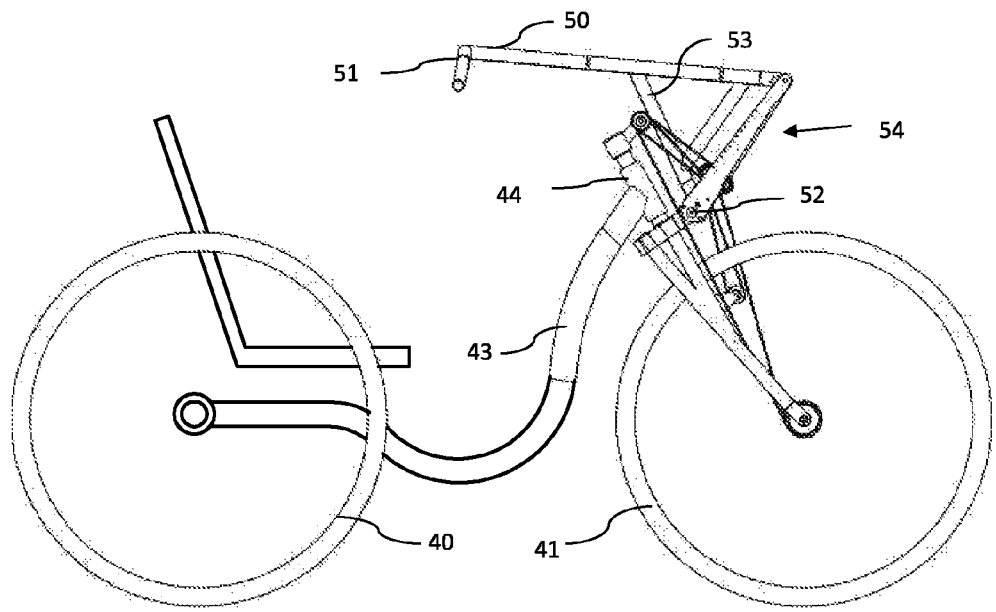
FIG. 6 is similar to FIG. 5 that shows the system in the end position of the pulling step.

FIG. 6 is a similar view to FIG. 5 and shows the steering and driving assembly in its extremely pulled state when it is closest to the body of the subject, when the steering column 50 is close to the horizontal direction. The triangular tiltable frame 48 is held at the aforementioned pivoted shaft 52, and the leg opposite to the vertex angle of the triangle formed at the shaft 52 is constituted by the forward leg 49. The adjacent leg to this vertex angle is a tubular rod 53 that provides the required stability for the tiltable frame 48 and its end remote to the shaft 52 is welded to the steering column 50 where the steering column 50 meets with the forward leg 49. The side view of FIGS. 5 and 6 do not show that the tiltable frame 48 is a spatial frame formation, and the triangular structure consists of a pair of triangles spaced in a direction transverse to the plane of the drawing, and these triangles are interconnected by transverse rods. The hypotenuse of the triangles are made by respective spaced pairs of flat bars and each pair has a recessed edge and form shifting bars 54 comprising parts 54 a, b, c and d. The two triangle pairs are interconnected at their front vertexes by respective transverse connection rods 55.

Figure 7:
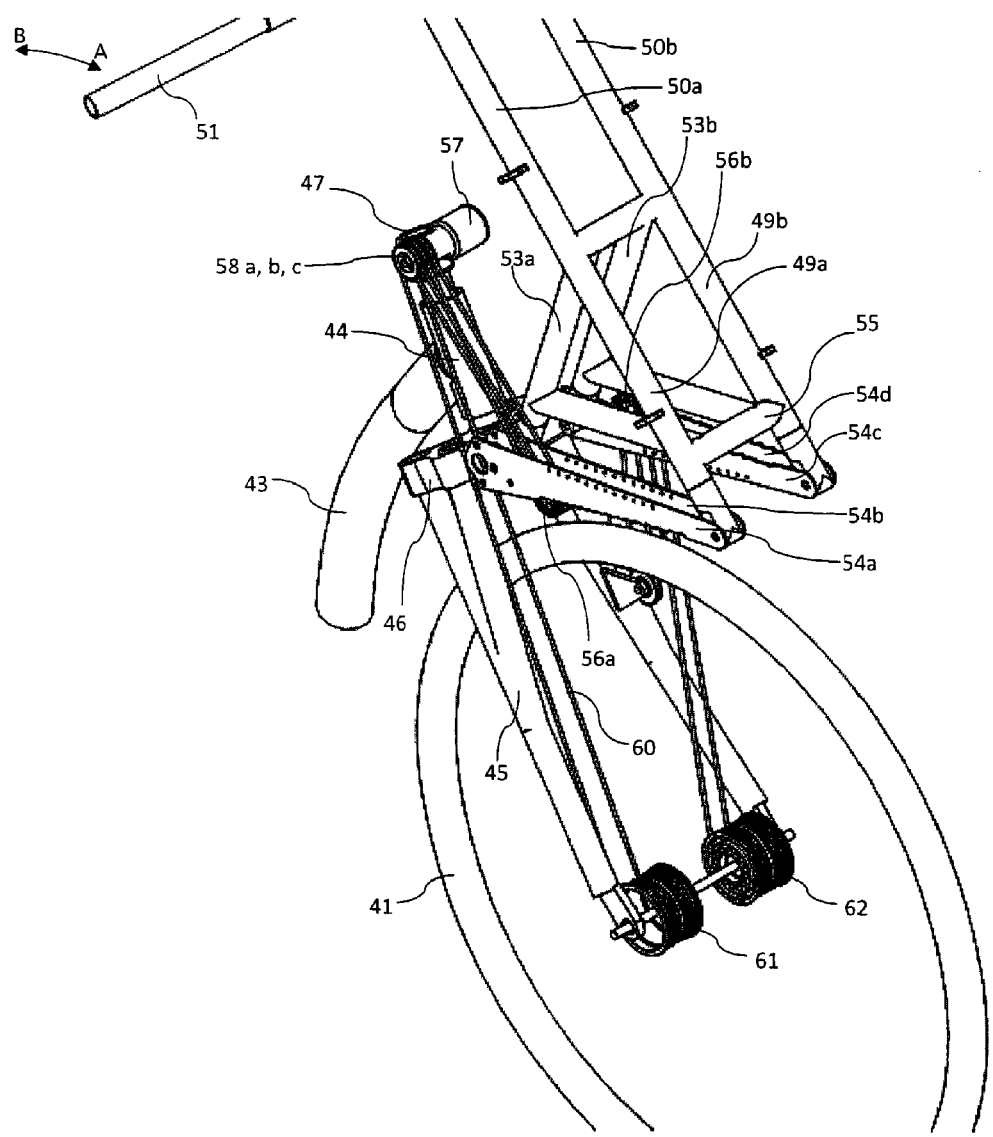
FIG. 7 is an enlarged perspective view in the end position of the pushing step.

FIG. 7 shows an enlarged perspective view of a detail of the assembly shown in FIG. 6. The part of the double tiltable frame 48 that is closer to the viewer will drive the front wheel when the handlebar 51 is pushed forward, therefore this side (that corresponds to the left side of the disabled subject sitting in the vehicle) will be referred to as "pushed side" and the other side will called as "pulled side", because this side drives the vehicle when the handlebar 51 is pulled. Out of the four shifting bars 54 bars 54*a* and 54*b* are at the pushing side and spacing is provided between them, and along the lower edges of these bars 54*a* and 54 respective recesses are provided, and a rope wheel 56*a* is arranged at these recesses which rope wheel is stressed to a pair of associated recesses during the pushing phase, The rope wheel 56*a* fulfils the role of a shifter during the pushing phases and it can be moved forward and backward along the recesses by means of a moving assembly not shown in the drawing. The recesses fix the position of the rope wheel 56 in any given recess pair.

In the other pulling side there are spaced shifting bars 54*c* and 54*d* which are similarly designed as the bars 54*a* and 54*b*, the difference lies in that here the upper edges are recessed, and the shaft of a pulling rope wheel 56*b* always engages a selected recess pair. Because the rope wheel 56*b* is at the upper side, the most part of the rope wheel 56*b* can be seen in FIG. 7 whereas in the pushing side a major part of the rope wheel 56*a* is covered.

It should also be mentioned that a support stud 57 with horizontal axis is attached to the end of the support tube 43 of the fork 45 that holds three rope wheels 58*a*, 58*b* and 58*a* arranged adjacent to each other, and each of them guides a respective rope branch, and these wheels are individually pivoted and can be turned around their axes independent from the movement of the neighboring wheels. For the sake of better illustration FIG. 7 does not show the stable attachment between the support tube 43 and the support stud 57.

When the handlebar 51 is pushed forward, then the left side (which is closer to the viewer of FIG. 7) drives. For explaining the way how the driving operation takes place in FIG. 7 a simplified rope guiding has been shown, therefore only rope 60 of the pushing side is indicated. The lower end portion of the rope 60, similar to the way as explained in the previous embodiment, is wound for a few turns around a left rope drum 61 attached to the hub of the front wheel 41 and the rope end is fixed to this drum. The path of the rope 60 after leaving the rope drum 61 extends steeply in upward direction and is led around the outermost rope wheel 58*a*. The rope wheels 58*a,b* and *c* are located much higher than the shifting bars 54*a* and *b*. In FIG. 7 the assembly is in its lowermost position, but in FIG. 6 the same can be observed in the other (upper) extreme position, but the rope wheels 58*a,b* and *c* are always in a much higher position than the shifting bars 54. On the rope wheel 58*a* the path direction of the rope 60 gets reversed and proceeds in downward direction, and it is led around the rope wheel 56*a* which is mostly not visible in FIG. 7. When the handlebar 51 is pushed forward, the tiltable frame 48 moves in the direction indicated by the arrow A (which is the pushing direction), and the rope wheel 56*a* pulls the rope 60 in downward direction. This downward movement will be reversed at the highly located rope wheel 58*a* and this pulling of the rope will move the rope drum 61 forward. In this way the pushing of the handlebar 51 drive the front wheel 41 forward. The extent of the rope displacement depends on the distance between the rope wheel 56*a* and the axis of the tilting movement. In case of a higher distance the rope displacement will be higher and in case of smaller distance the rope displacement will be smaller. This means that in the pushing side the transmission ration can be changed by adjusting the position of the rope wheel 56*a* on the pushing shifting bars 54*a* and *b*, however, this adjustment has no effect on the other i.e. pulling side.

When the extreme pushing position has been reached, the handlebar 51 can only be pulled, and in this case the path length of the rope 60 will be shorter because the rope wheel 56*a* moves upward, then the rope 60 will remain in tensioned state under the pulling effect of the spring in the rope drum 56*a*, and this tensioned bias pushes the shaft of the rope wheel 56*a* to the shifting bars 54*a,b*.

On the other pulling side the rope branch has not been shown, but there will be no need for the rope to reverse its direction, because when the handlebar 51 is pulled, the displacement occurs in the direction of the arrow B and the shifting bars 54*c* and *d* will get raised. Then the rope on the pulling side (not shown) will directly pull the rope drum 62 at the pulling side and the rotation of this rope drum 62 will drive the front wheel 41. The transmission ratio will also depend on the position of the rope wheel 56*b* on the shifting bars 54 *c* and *d*.

Figure 8:
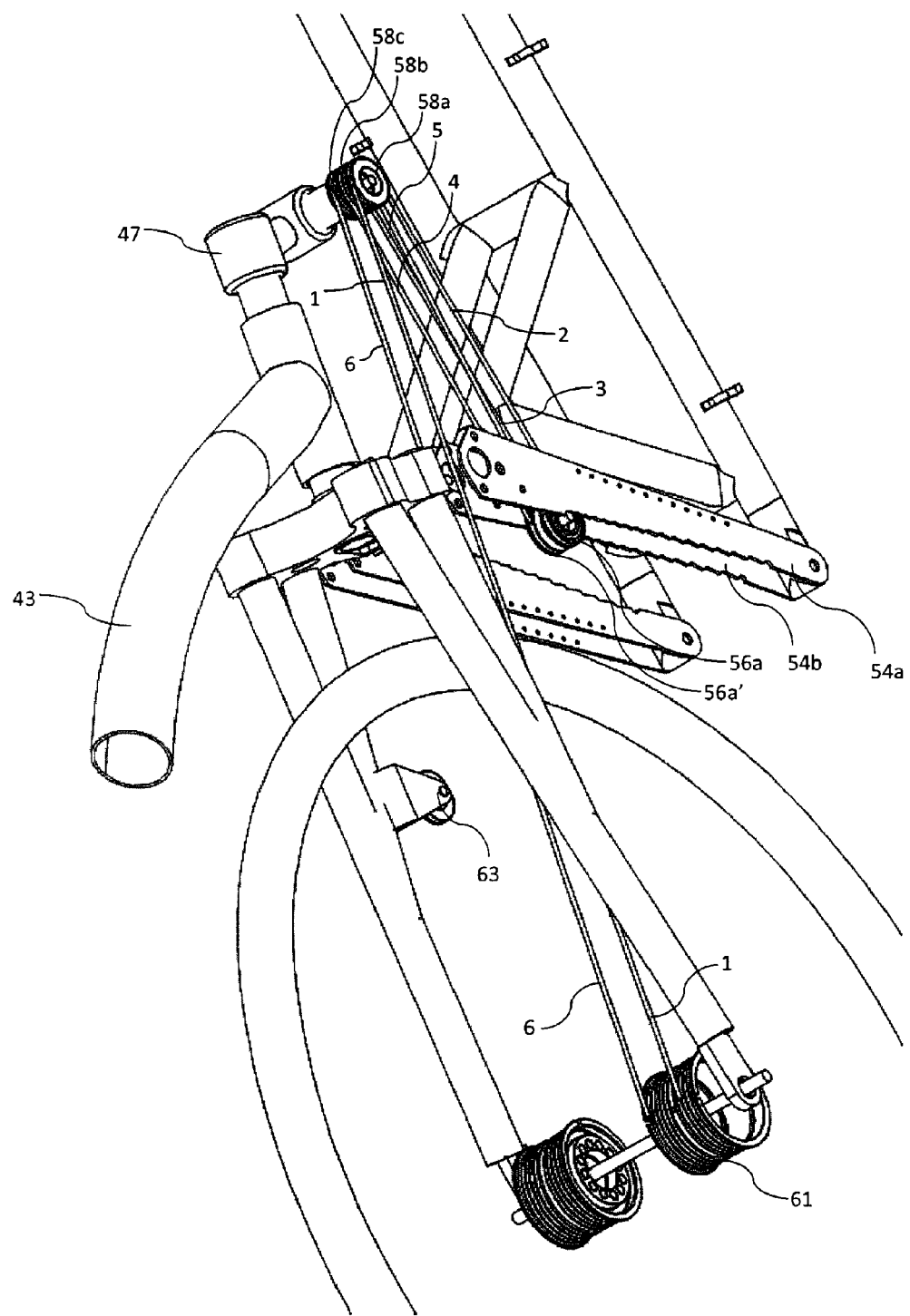
FIG. 8 is a further perspective view with a greater scale showing also the pushing end position.

Although the drive described up to the present is fully operative, for the sake of providing symmetry and a higher transmission ration it is worthwhile to us double rope arrangement at each sides. Such a double rope arrangement is described in the two previously referred international publications. FIG. 8 shows an enlarged perspective view which shows the rope path in the pushing side. In this figure it can be seen that the transverse support stud 57 that holds the independent rope wheels is actually fixed to the end of the of the support tube 43.

For the sake of better identification of the respective rope branches, separate reference numerals were used for their indication. The first branch 1 of the rope 60 is wound on the rope drum 61 and it is fixed thereto. The rope branch 1 lasts till the rope wheel 58*a*, arrives at the left side of the wheel and leaves it in downward direction as rope branch 2. For the full understanding it has to be noted that in case of double rope paths, in the spacing between the shifting bars 54*a* and 54*b* a pair of rope wheels 56*a* and 56*a*' are arranged on a common shaft, and each of them is associated with a respective rope branch. The rope branch 2 that leaves the rope wheel 58*a* at its right side leads to the right side of the rope wheel 56*a*, there its direction is reversed and continues in upward direction as rope branch 3 that leads to the right side of the central rope wheel 58*b* of the three adjacent rope wheels, it changes direction and continues its path as rope branch 4. This rope branch 4 leads to the left side of the other rope wheel 56*a*', changes direction and continues its path in upward direction as rope branch 5, it leads to the rear side of the third upper rope wheel 58*b*, gets reversed and continues its path at the left side in downward direction as rope branch 6. The rope branch 6 has a long downward path towards the other (inner) side of the rope drum 61, it is wound there then its end is fixed to the drum.

This double rope path has the advantage that the unity displacement of the rope wheels 56*a* and 56*a*' of the shifting bars 54 *a,b* causes the double displacement of the rope branches 1 and 6, whereas the central rope wheel 58*b* of the upper wheels balances the potential flexible and resilient expansion of the respective rope branches when these branches get stressed. A further advantage lies in that the load of the rope drum 61 will remain always balanced (symmetric) because the resulting force of the two rope branches 1 and 6 will always fall in the middle of the rope drum.

The displacement of the double rope wheels and of the ropes along the shifting path will correspond to the way as described in the above referred international publications, the difference lies in that in those prior solutions the shifting paths of the two sides were interconnected, while according to the present invention the adjustment of the positions of the rope wheels along the associated shifting paths in the pushing and pulling sides is independent from each other. This does not exclude the possibility of interconnecting the two shifting movements, but in case of pushing and pulling drives it is preferred if the transmission ratios of the respective sides can be adjusted separately.

Figure 9:
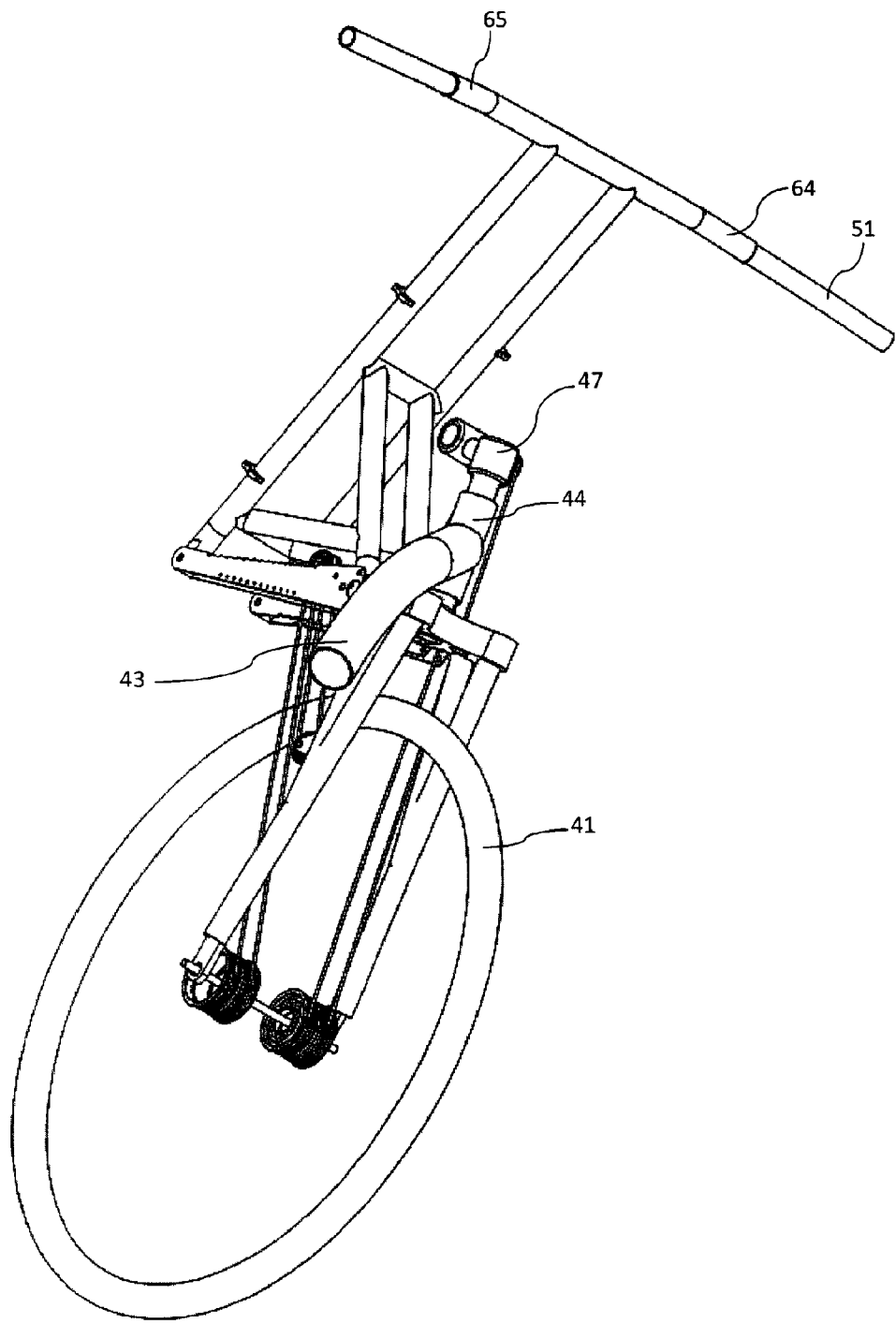
FIG. 9 shows the system when the handlebar has been turned.

Finally, in connection with FIG. 9 it will be shown that the handlebar 51 can be used not only for driving the vehicle as both its pushing and pulling movements drive the front wheel 41 in forward direction, but it can also be used for steering the vehicle. In FIG. 9 the direction of the body of the vehicle is determined by the direction of the support tube 43, and with respect to this tube the handlebar 51 is in turned position. The turning of the handlebar 51 is possible because in the fork holding sleeve 44 that is attached to the support tube 43 the front fork 12 and its support rod are pivoted for rotation around the fork axis, therefore the fork 12 can be turned with respect to the support tube 43. Because the tiltable frame 48 and the whole afore described assembly are connected to the fork 12, the turning of the handlebar 51 which is also coupled to the fork 12 is possible in both directions and causes turning of the first wheel 41 with respect to the frame, thus the steering of the vehicle in a conventional way. It can also be understood from the drawings that the tilting movement that is characteristic for this drive cannot block the steering. In case of steering the forward and backward pushing and pulling has to be done in a direction normal to the handlebar, and such a movement can be learned easily.

In FIG. 9 on both sides of the handlebar 51 respective shifting grips 64, 65 have been schematically indicated, and the rotation of these grips causes the adjustment of the transmission ratios on the associated side.

If the two exemplary embodiments are compared, it can be understood that the function of the two driving bars 15, 16 of the first embodiment is performed by the single handlebar 51 of the second embodiment, and this handlebar 51 corresponds to the two driving bars, as its respective ends are also held by the left and right hands of the subject.

The solution according to the invention can be realized in several different ways then shown in these two embodiments, therefore the invention cannot be limited to any one of the examples described. Although these embodiments ere used in three-wheeled vehicles intended for disabled subjects, the driving system can be used (as described in the introductory part of the specification) for other purposes including training, rehabilitation or therapeutic applications, furthermore as a specific e.g. recumbent bicycle, and finally for driving boats where the driven axis can drive a paddle or propeller wheel. In case of driving a boat propeller, the boat can be steered by the adjustment the position angle of the propeller wheel. As the front fork and the drive constitutes a self-contained unit with the driven front wheel, the invention can be placed in the front fork of a conventional bicycle, whereby the rider can use both his hands and feet and can coach his leg and arm muscles.

The invention claimed is:
1. A device for driving a rotating member of a vehicle by pushing and pulling movements, for a disabled rider, comprising:
   a frame (10),
   a fork (12) pivoted with respect to the frame (10) for steering the vehicle, said fork comprising left and right fork tubes, said left and right fork tubes terminating in rotating member supports,
   a rotating member supported between said rotating member supports,
   a front wheel (41) supported on said rotating member,
   a left driving bar and a right driving bar positioned at respective sides of the vehicle, said left driving bar and said right driving bar being configured for engagement by left and right hands of the rider, and
   first and second biased drums, said first and second drums being coupled to drive the rotating member,
   first and second cables adapted to be wound on said first and second drums respectively, wherein the pulling and unwinding of said first or second cable causes rotation of the rotating member in a same direction,
   a mechanical unit that converts both the forward and backward movements of said left driving bar and said right driving bar corresponding to pushing and pulling movements, to alternately unwind said first and second cables and rotate said rotating member,
   said left and right driving bars are interconnected and are pivoted for limited angular displacement around a common shaft, wherein a displacement in a first direction requires a pushing motion and a displacement in an opposite second direction requires a pulling motion, wherein owing to their interconnection said pushing and pulling motions of the left and right driving bars cause simultaneous bar displacements in a same direction of said left and right driving bars, the cables when they are unwound from their respective drums are alternately wound on their respective drums by a force exerted by a first biasing spring associated with said first drum, and a second biasing spring associated with said second drum, wherein the front wheel is a driven wheel of the vehicle, and the driving bars are connected to the fork, and the vehicle is steered by the driving bars by their connection to the fork.

2. The device as claimed in claim 1, wherein at the respective sides the paths of the ropes (30, 60) are led through respective rope wheels (21, 22; 56a, 56b) which constitute said connection between the ropes (30, 60) and the respective driving bars (15, 16; 51), and said rope wheels (21, 22; 56a, 56b) are arranged so that their distances from said shaft (17, 52) of rotation can be adjusted within a limited range and independent from each other, whereby a transmission ratio between the displacement of the driving bars (15, 16; 51) and the angular displacement of the driven shaft can be separately adjusted for the pushing and pulling movements.

3. The device as claimed in claim 1, wherein respective pairs of ropes are wound on each rope drum (28, 29; 61, 62) and said pairs are pulled simultaneously and in a same extent by any movement of the associated driving bar.

4. The device as claimed in claim 1, wherein a direction which is transverse to the direction of the pushing and pulling movements a rigid connection is provided between the driving arms (15, 16; 51) and the driven shaft, and the device is held by a support tube (10c; 43,44) of the frame (10), and with respect to the support tube (10c; 43, 44) the device is pivoted for angular displacement around an axis that is transverse to the direction of the pushing and pulling movement.

5. The device as claimed in claim 4, wherein the fork (12) is held in a fork receiving tube (10d) or fork holding sleeve (44) fixed to the frame (10).

6. The device as claimed in claim 5, wherein the vehicle is a three-wheeled vehicle, and the driven wheel is a first steered wheel.

7. The device as claimed in claim 5, wherein the driven shaft is held by a fork (1) which is pivotally kept in a fork receiving tube (10c) that is connected with the frame (10), and beyond the fork receiving tube (10c) the shaft of the fork (12) is connected through a cardan coupling (13) to a stiff control bar (14) having a tilted axis, and the pivoted shaft (17) of the pushing and pulling motion is connected to the control bar (14), the pushing and pulling driving bars (15, 16) are connected to this pivoted shaft (17), the pushing driving bar (15) is extended over the shaft (17) and the displacement of the extended part of the driving bar is opposite to the displacement of the hand-held part of the pushed driving bar (15), and the rope wheel (21) that provides for a direction reversal of the rope is slidably fixed to this extended part of the driving bar, the pulling driving bar (16) has also a portion that extends over the pivoted shaft (17) and the two extended parts of the two driving bars (15, 16) are pivotally connected to first ends of a pair of connection members (18, 20) and the second ends of the connection members (18, 20) are pivotally connected to a sliding bar (19) that is slidably guided for axial displacement along the control bar (14), so that these pivotal connections ensure an identical displacement of the two driving bars (15, 16).

8. The device as claimed in claim 5, wherein a stiff fork holding sleeve (44) is connected to the frame (10), the shaft of the driven wheel (11) is held by the fork (45) with a fork bar held and pivotally guided for angular displacement in the fork holding sleeve (44), the fork bar extends beyond the fork holding sleeve (44) in upward direction;

the fork (45) has branches interconnected by a block (46) and in a transversal bore provided in the block (46) a shaft (2) is pivotally held that extends normal to an axis of the fork (45) and constitutes said common shaft (52), a tiltable frame (48) is pivotally attached to the shaft (52) that has a forward leg (49) that extends beyond the frame (48) and this extended leg constitutes a steering column (50) and an upper part of the steering column (50) is rigidly connected to a handlebar (51) that constitutes both of said driving bars, and when the handlebar (51) is pushed or pulled, the tiltable frame (48) will turn around said common shaft (52) in a predetermined angular range in an upward or downward direction, the tiltable frame (48) has lower legs constituted by shifting bars (54 a,b; 54 c,d), rope wheels (56a, 56b) are guided along and adjustably fixed on said shifting bars (854 a,b; 54 c,d) and the paths of the respective ropes (60) coming from the rope drums (61, 62) are led around said an associated one of said rope wheels (56a, 56b), and in said extended part of the fork bar said direction-reversing rope wheel (58a) is pivotally fixed, and a rope branch (1) that leaves the rope drum (61) associated with the pushing side leads through this direction-reversing rope wheel (58a) to the rope wheel (56a, 56a') guided on the associated shifting bar (54a,b).

9. The device as claimed in claim 8, wherein in each side respective pairs of rope branches are wound on the rope drums (61, 62), the shifting bars are made of respective pairs of spaced shifting bar plates (54 a,b; c,d), respective pairs of rope wheels (5a, 56a') are connected with respective shafts and they are held by and guided along said pairs of spaced shifting bar plates (54 a,b; c,d), and further three rope wheels (58 a,b,c) are provided at each side, and at the pushing side these further three rope wheels (58 a,b,c) are pivotally arranged on a common shaft so that they can be freely turned independent from each other, and their common shaft is fixed on a support stud (57) attached to an upper end region of the fork shaft, wherein the rope wheels (58 a, c) at the sides ensure the reversal of the direction of the associated rope branches and the central rope wheel (58b) acts as a balance wheel.

10. The device as claimed in claim 8, wherein the tiltable frame (48) is made of a rigid formation of a spatial double triangle that comprises two spaced parallel triangles welded by three tubes and reinforcing tubes connecting the triangles.

11. A device for driving a rotating member of a three-wheeled vehicle by pushing and pulling movements, comprising:
a frame (10),
a fork (12) pivoted with respect to the frame (10) for steering the vehicle, said fork comprising left and right fork tubes, said left and right fork tubes terminating in rotating member supports,
a rotating member supported between said rotating member supports,
a front wheel (41) supported on said rotating member,
a left driving bar and a right driving bar positioned at respective sides of the vehicle, said left driving bar and said right driving bar being configured for engagement by left and right hands of the rider, and
first and second biased drums, said first and second drums being coupled to drive the rotating member,
first and second cables adapted to be wound on said first and second drums respectively, wherein the pulling and unwinding of said first or second cable causes rotation of the rotating member in the same direction,
a mechanical unit that converts both the forward and backward movements of said left driving bar and said right driving bar corresponding to pushing and pulling movements, to alternately unwind said first and second cables and rotate said rotating member.

* * * * *